United States Patent

[11] 3,590,760

| [72] | Inventors | John H. Boyd<br>Woodstock, Ontario;<br>James K. Robinson, Dryden, Ontario, both of, Canada |
| --- | --- | --- |
| [21] | Appl. No. | 746,416 |
| [22] | Filed | July 22, 1968 |
| [45] | Patented | July 6, 1971 |
| [73] | Assignee | Timberjack Machines Limited<br>Woodstock, Ontario, Canada |

[54] TIMBER-HARVESTING MACHINE AND METHOD
7 Claims, 40 Drawing Figs.

[52] U.S. Cl. ............................................. 144/3 D,
144/2 Z, 144/309 AC, 144/34 E
[51] Int. Cl. ....................................................... A01g 23/02
[50] Field of Search ............................................ 144/2 Z, 3
D, 34 R, 34 E, 309 AC

[56] References Cited
UNITED STATES PATENTS

| 2,981,301 | 4/1961 | Busch et al. ................. | 144/3 |
| --- | --- | --- | --- |
| 3,140,736 | 7/1964 | Propst ......................... | 144/3 |
| 3,236,274 | 2/1966 | Eynon ......................... | 144/3 |
| 3,308,861 | 3/1967 | Hamilton..................... | 144/3 |
| 3,356,116 | 12/1967 | Brundell et al. ............. | 144/3 |
| 3,398,774 | 8/1968 | Hahn............................ | 144/309 |
| 3,443,611 | 5/1969 | Jorgensen..................... | 144/2 |
| 2,882,941 | 4/1959 | Pope ............................ | 144/3 |
| 3,059,677 | 10/1962 | Busch et al. ................. | 144/3 |
| 3,102,563 | 9/1963 | Horncastle .................. | 144/3 |
| 3,294,131 | 12/1966 | Larson ........................ | 144/3 |
| 3,329,184 | 7/1967 | Longert....................... | 144/3 |

Primary Examiner—Gerald A. Dost
Attorneys—Peter Kirby and George A. Seaby

ABSTRACT: A self-propelled vehicle carries an extensible boom on the end of which there is mounted an assembly for grasping and felling a tree. The boom retracts to convey the felled tree to a processing platform on the vehicle. While the tree is being processed (delimbed and bucked into bolts) the boom returns to fell a second tree thus avoiding idle time. Delimbing is carried out by a delimbing head that slides out along the felled tree while it lies horizontally with one end clamped on the platform. The delimbing head then retracts to propel the tree back onto the platform where the delimbed portion is cut off to form a bolt, this process being repeated.

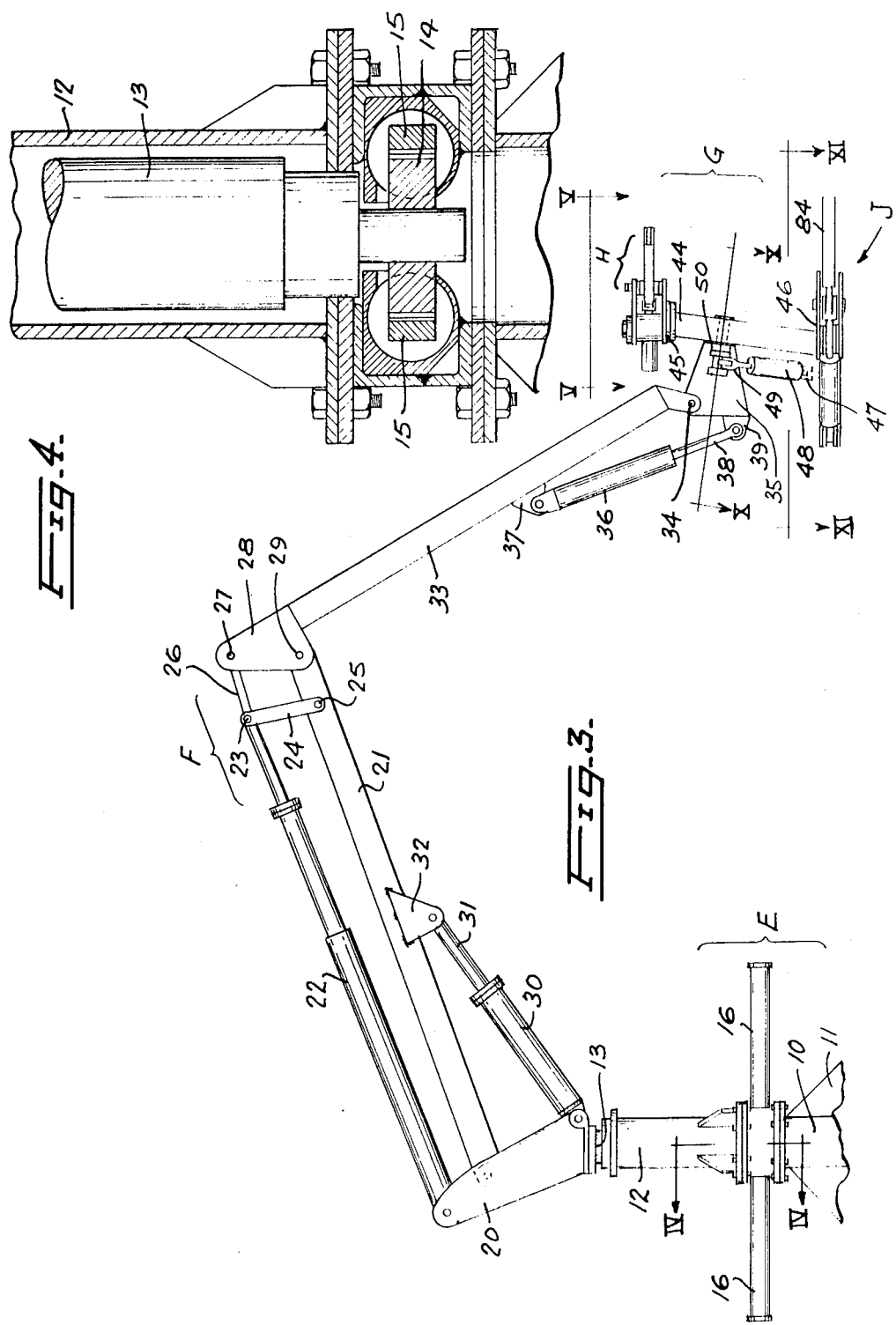

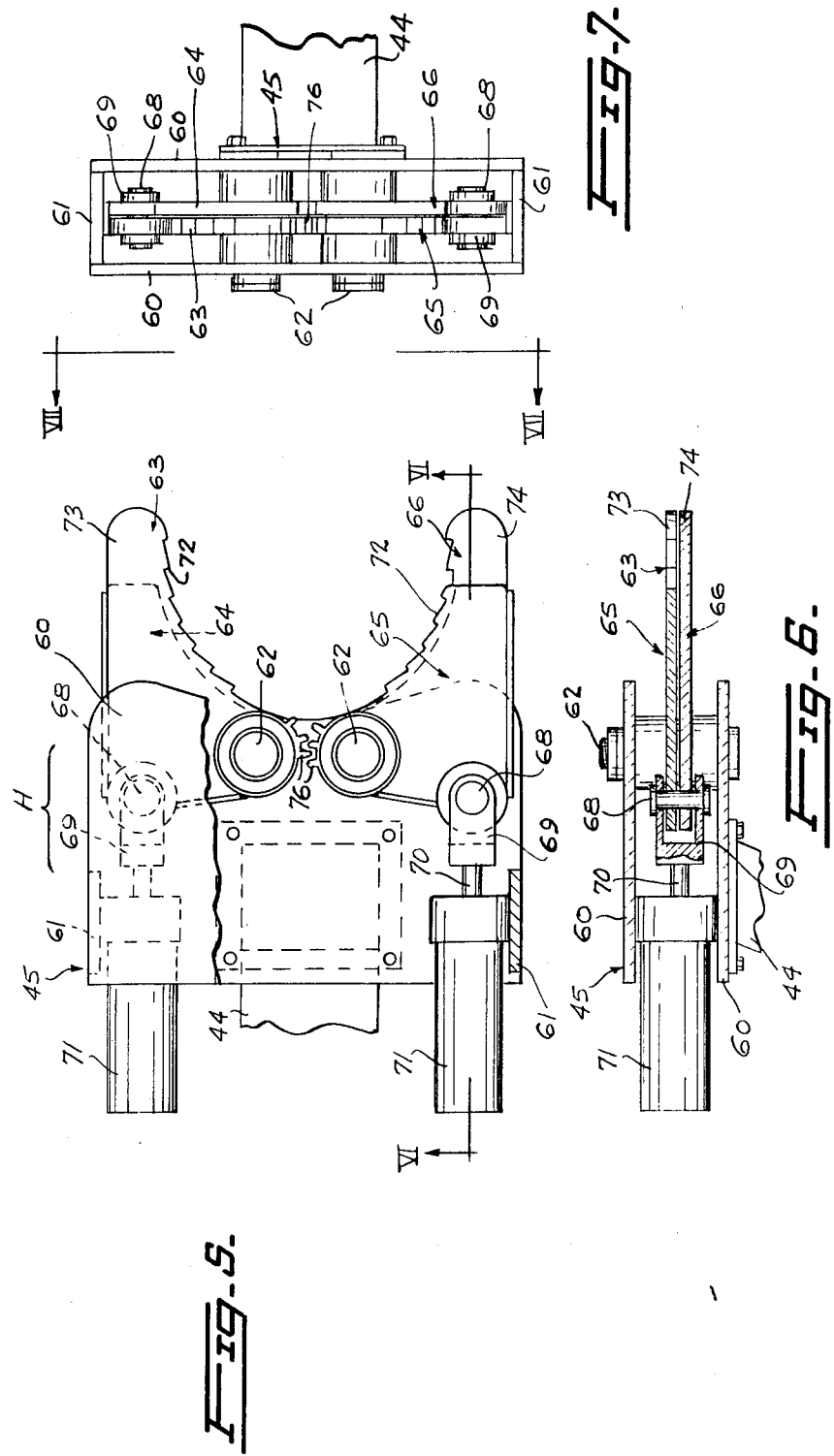

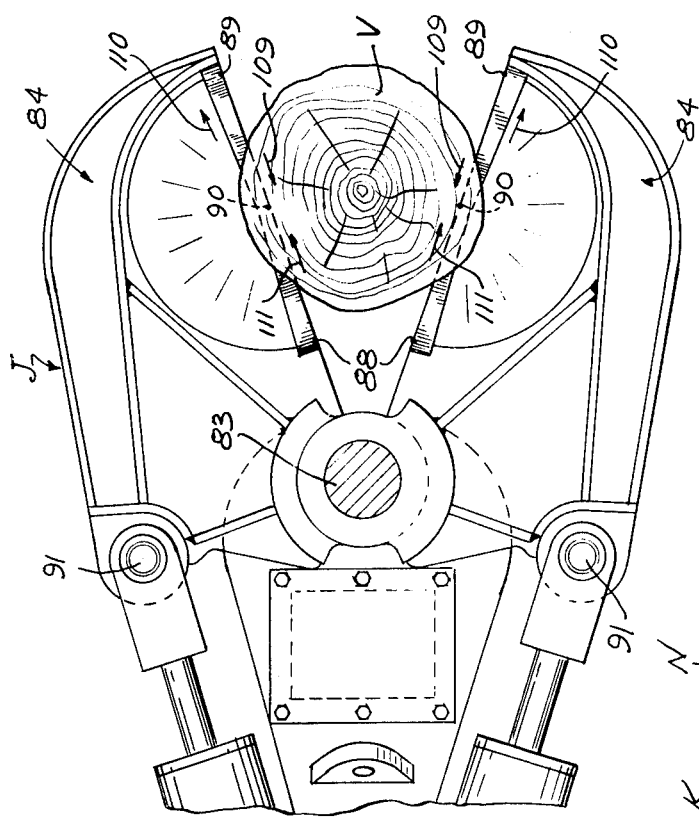
Fig. 7.
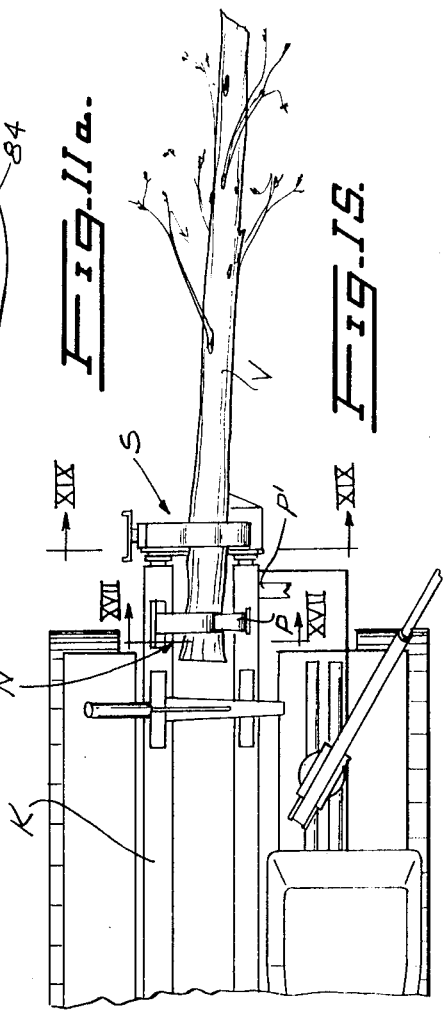
Fig. 11a.
Fig. 15.
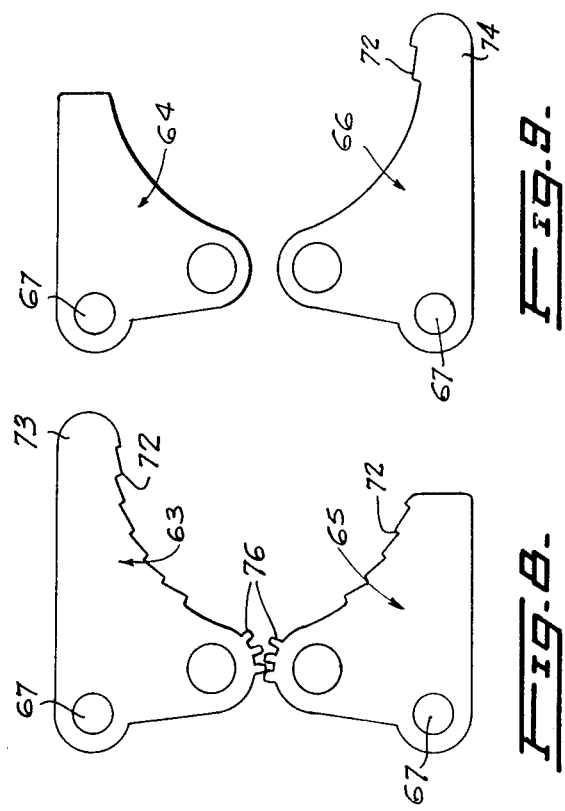
Fig. 9.
Fig. 8.
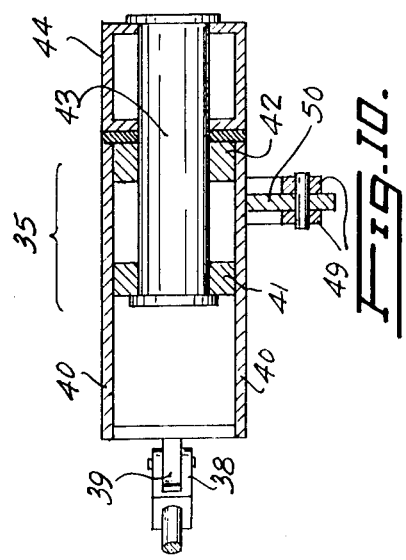
Fig. 10.

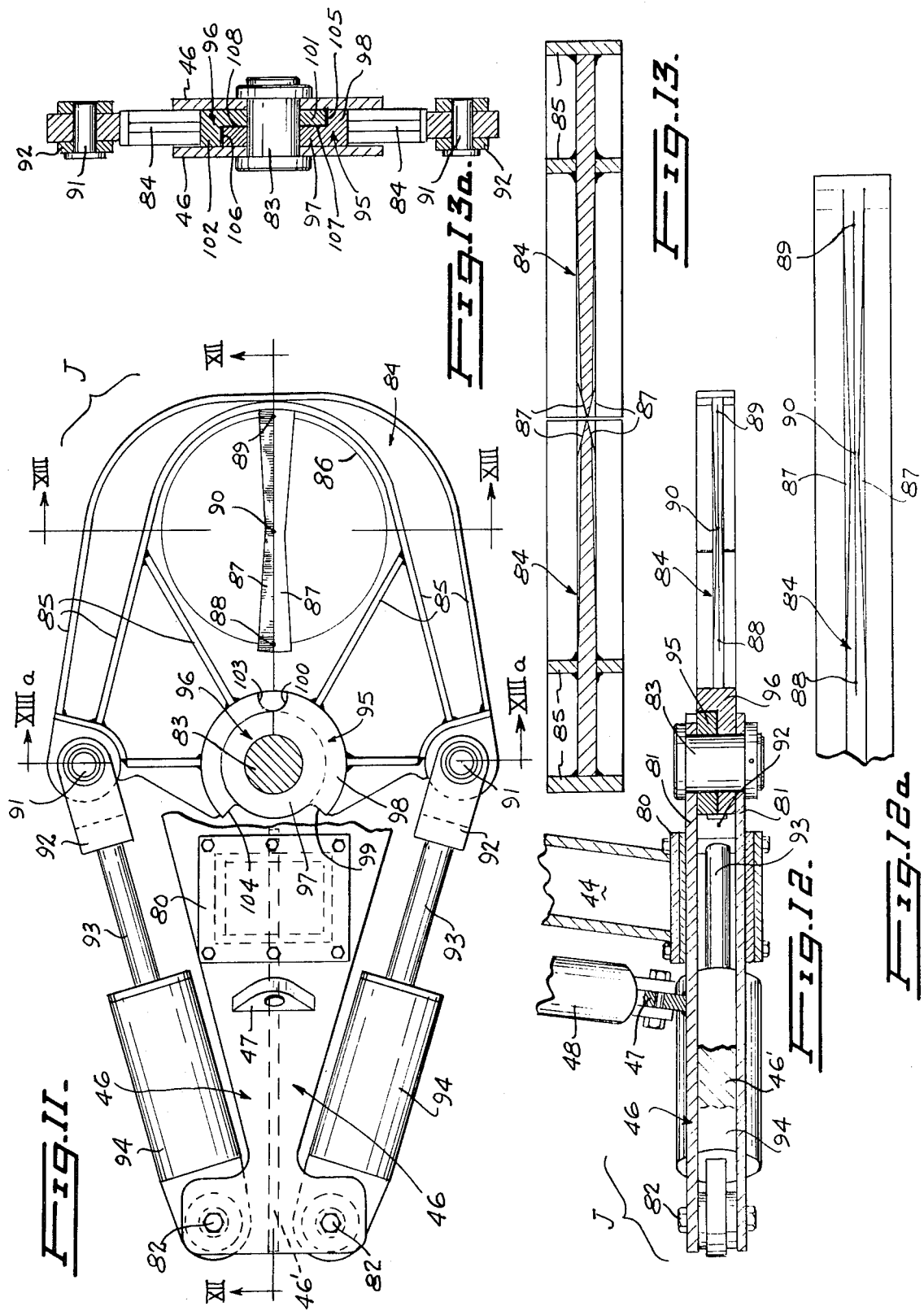

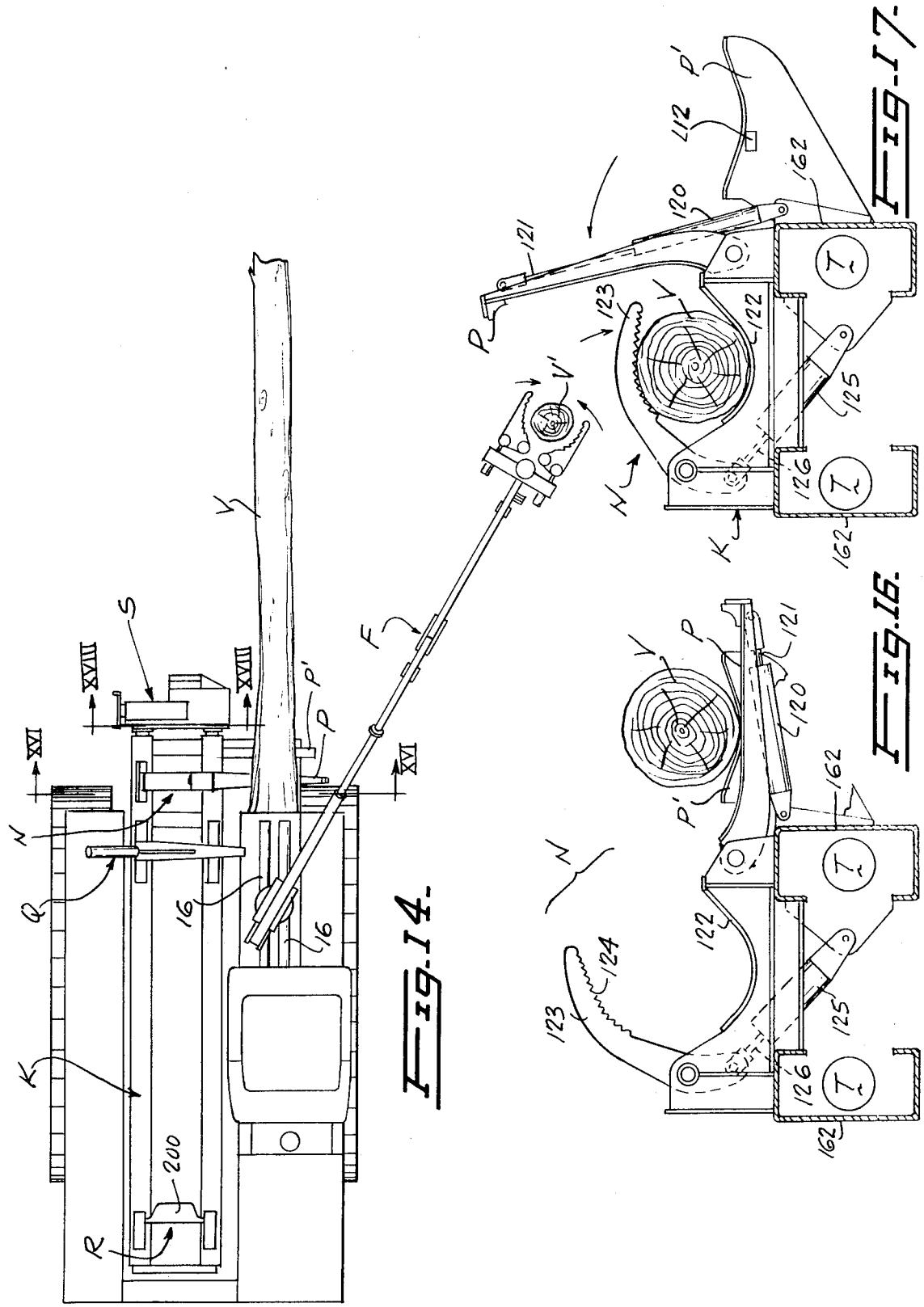

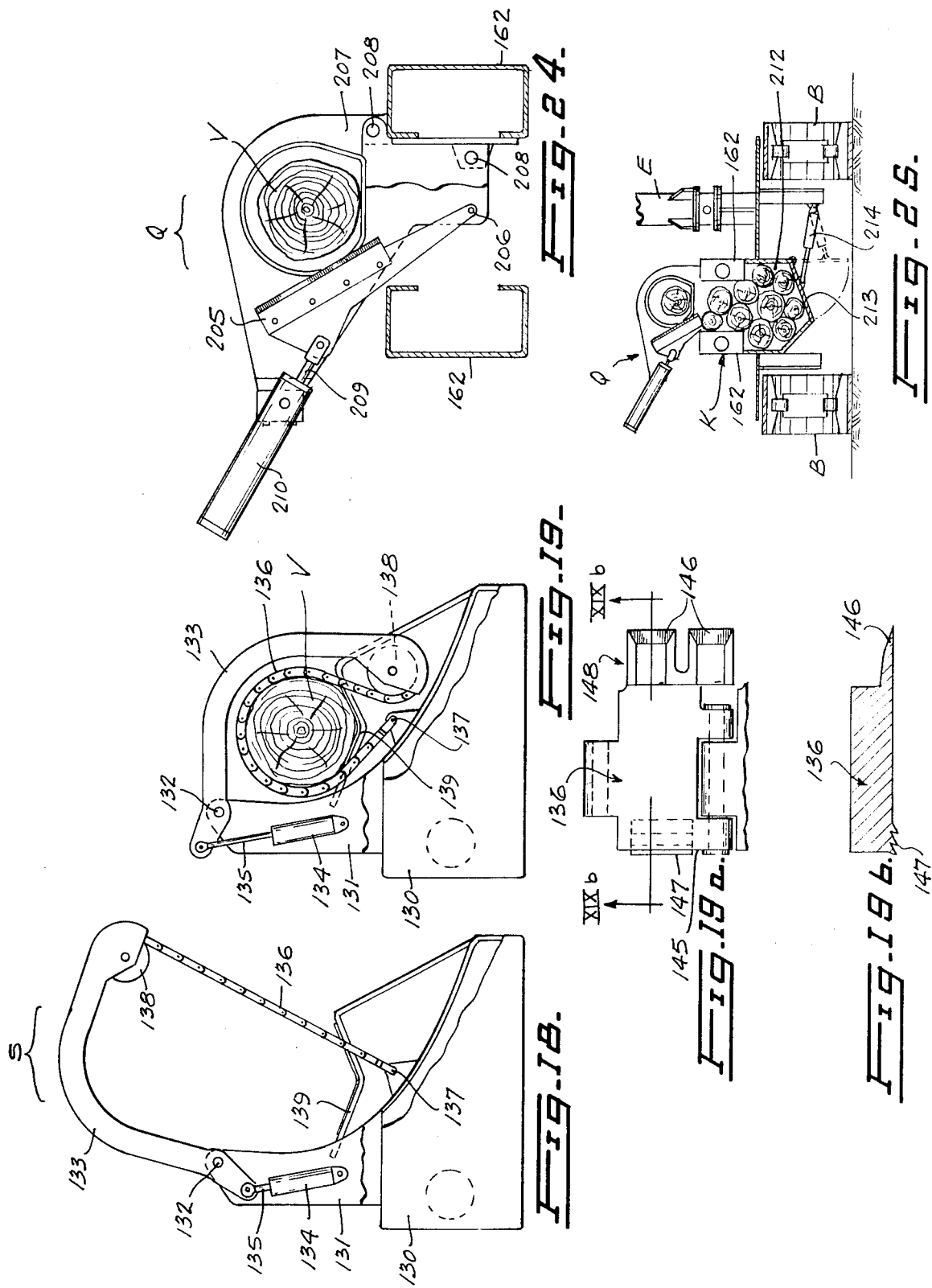

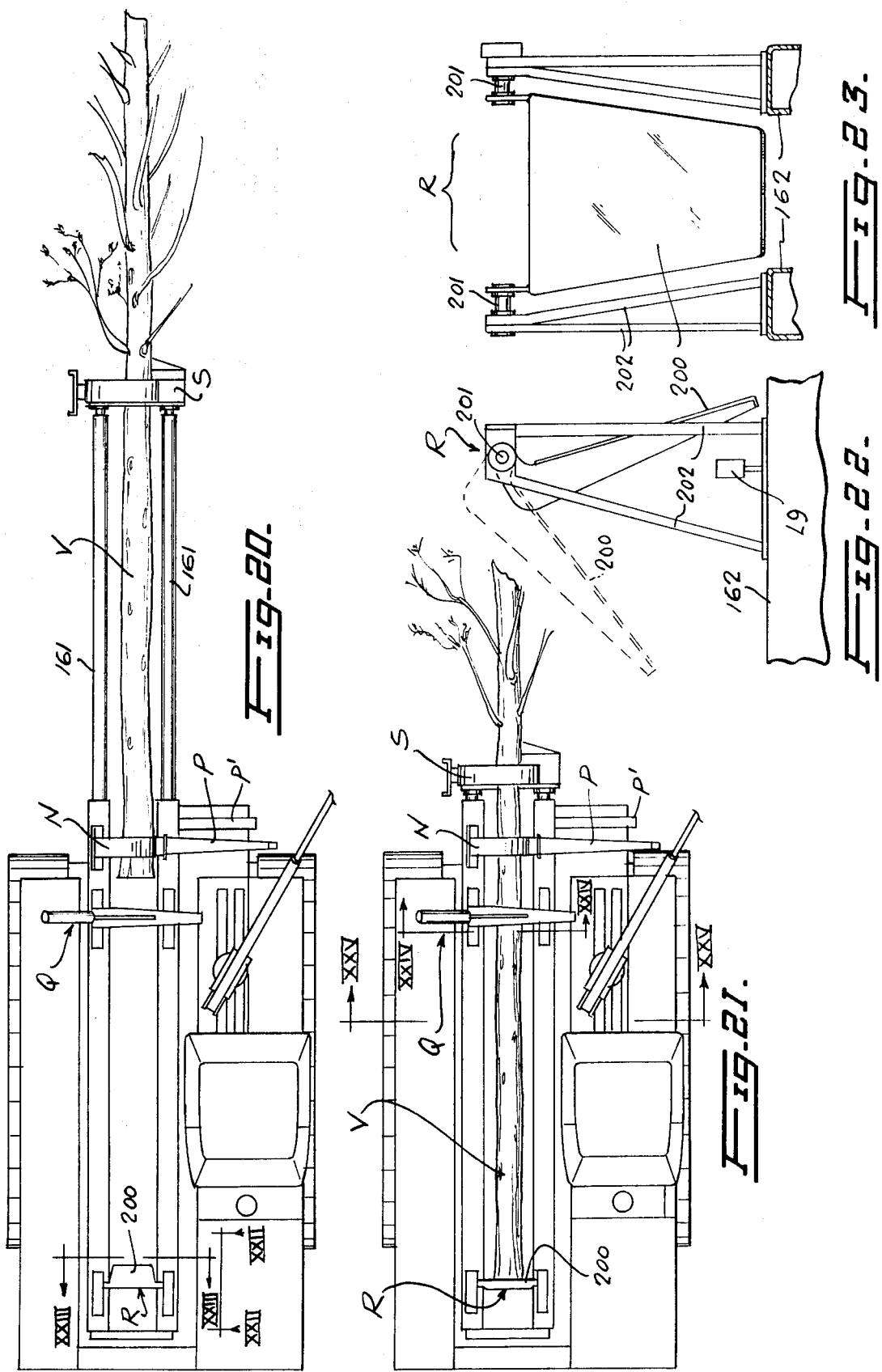

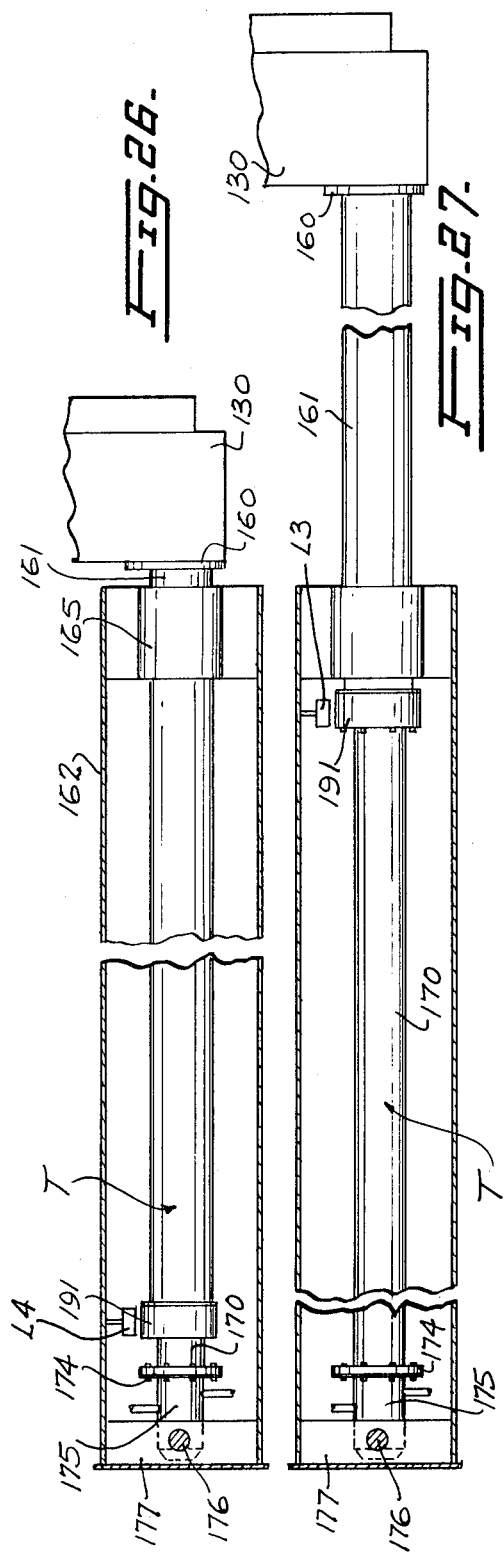
Fig.26.
Fig.27.
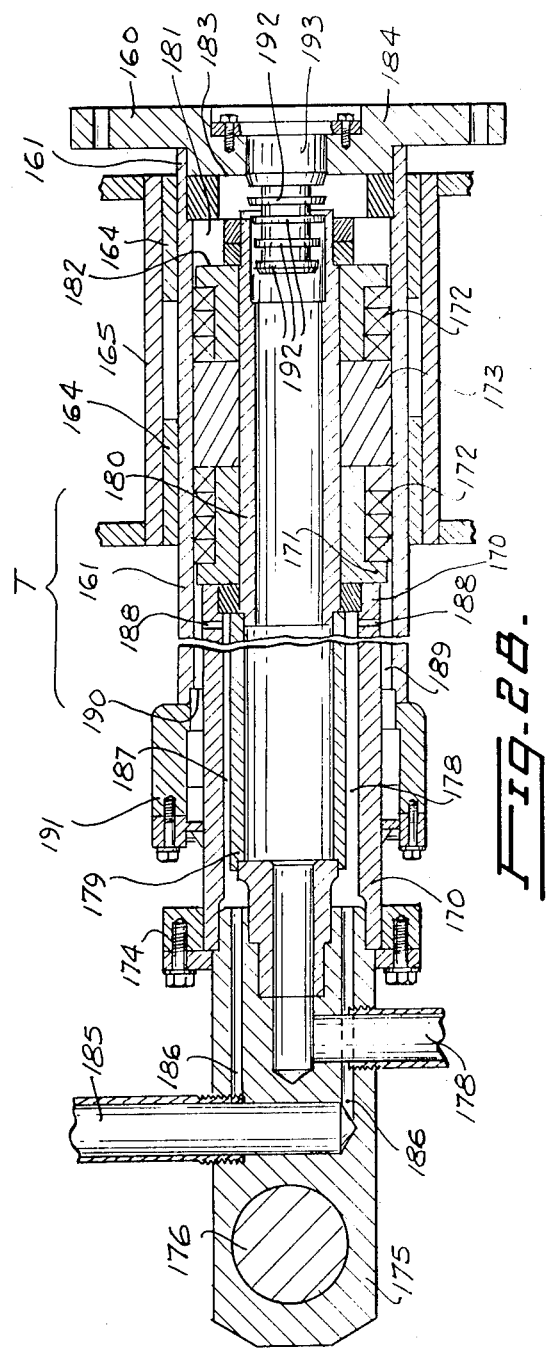
Fig.28.

KICKER ARM P

CLAMP N

CLOSURE OF
DELIMBING UNIT S

TRAVEL OF
DELIMBING UNIT S

BUCKING SHEAR Q 3,590,760

TIMBER-HARVESTING MACHINE AND METHOD

RELATED APPLICATIONS

U.S. applications of J. Boyd et al. Ser. Nos. 746,431 now U.S. Pat. No. 3,531,235 and 746,430 filed concurrently herewith and corresponding to Canadian applications of J. H. Boyd et al. Ser. Nos. 012,441 and 012,443, filed Feb. 14, 1968.

This invention relates to a timber harvester of the type comprising a self-propelled vehicle that is capable of travelling into a stand of trees and felling and processing the trees at the site, such trees being delimbed and bucked into bolts by the harvester for stacking and subsequent transportation out of the forest. This type of machine is commonly referred to as a short wood harvester, in contrast to tree length and whole tree harvesters that make no provision for bucking the trees into lengths before transportation out of the forest.

Short wood harvesters are known, but the prior machines of this type that have been built or proposed have all had certain disadvantages.

The object of the present invention is to provide an improved machine of this type. More specifically, it is an object of the invention to provide a machine that will operate unusually rapidly with the ability to fell, delimb and buck more trees per hour than any known machine of comparable size.

It is a further object to achieve this speed of operation without sacrifice of other advantageous features. In particular, a highly desirable feature of the machine is that it should be relatively small and light, so as to be both comparatively cheap to build and capable of operation in confined spaces and over difficult terrain.

These advantages are achieved in the harvester of the invention by the combination and cooperation in the structure of the machine of two essential sections, these being (a) an extensible boom that can reach out from the vehicle to fell a tree and transport it back to the vehicle itself, and that can do this repeatedly without the need to move the vehicle itself, and (b) a processing platform on the vehicle for receiving the felled trees to delimb and buck them, the processing instrumentalities on the platform being separate from and independent of those on the boom, in the sense that the two sections can perform their separate duties simultaneously, thus enabling the boom to be substantially fully occupied with felling operations without being subject to delays arising out of the need for the processing operations to be performed. On the other hand, the two sections of the machine are far from being independent of one another in the sense that their functions are interrelated both spatially and temporally.

It has been found that the ability of the present machine to carry out the two operations of felling and processing simultaneously represents a very significant advantage in terms of cycle time.

The invention also relates to a method of timber harvesting in which such operations are carried out simultaneously, with the product of the first operation (felling) being fed in a timed relation as an input into the second operation (delimbing and bucking).

These and other features of the invention will be more clearly understood from the accompanying drawings and the specific description which follows and which illustrate, by way of example only, one form of timber-harvesting machine embodying the invention.

In the drawings:

FIG. 3 is a side view, on a larger scale, of the crane and boom of FIG. 1;

FIG. 4 is a section on the line IV—IV in FIG. 3;

FIG. 5 is a view of the tree clamp taken on the line V—V in FIG. 3;

FIG. 6 is a section taken on the line VI—VI in FIG. 5;

FIG. 7 is a view taken on the line VII—VII in FIG. 5

FIG. 8 is a fragmentary view of one pair of jaw members of the tree clamp of FIGS. 5 to 7;

FIG. 9 is a view of a further pair of jaw members of the tree clamp of FIGS. 5 to 7;

FIG. 10 is a section on the line X—X in FIG. 3 taken through the center of the tree shear and clamp assembly;

FIG. 11 is a section taken on the line XI—XI of FIG. 3 showing the shearing device;

FIG. 11a is a view similar to FIG. 11 demonstrating diagrammatically the operation of the shearing device;

FIG. 12 is a section taken on the line XII—XII in FIG. 11;

FIG. 12a is an enlarged view of the right-hand end of FIG. 12;

FIG. 13 is a section taken on the line XIII—XIII in FIG. 11;

FIG. 13a is a section taken on the line XIIIa—XIIIa of FIG. 11;

FIG. 14 is a further plan view of the entire machine illustrating a first stage in the processing of a felled tree, with the tree clamp in position to clamp onto a second standing tree;

FIG. 15 is a fragment of FIG. 14 showing a second stage in such processing;

FIG. 16 shows a clamp and kicker arm assembly in a first position, being a section taken on the line XVI—XVI in FIG. 14;

FIG. 17 shows the assembly of FIG. 16 in a second position, being a section taken on the line XVII—XVII in FIG. 15;

FIG. 18 is a view of a delimbing unit in a first position, being a section taken on the line XVIII—XVIII in FIG. 14;

FIG. 19 is a view of the unit of FIG. 18 in a second position, being a section taken on the line XIX—XIX in FIG. 15;

FIG. 19a is a fragmentary view of the delimbing chain shown in FIGS. 18 and 19;

FIG. 19b is a section on XIXb—XIXb in FIG. 19a;

FIG. 20 is a further plan view of the machine showing a third stage in processing of a felled tree;

FIG. 21 is a view similar to FIG. 20 showing a fourth stage in the process;

FIG. 22 is a side view of a butt plate assembly taken on the line XXII—XXII in FIG. 20;

FIG. 23 is a front view of the butt plate assembly taken on the line XXIII—XXIII in FIG. 20;

FIG. 24 is a view of a bucking shear taken on the line XXIV—XXIV in FIG. 21;

FIG. 25 is a transverse section of the entire machine taken on the line XXV—XXV in FIG. 21;

FIG. 26 is a general side view of a cylinder assembly for operating the delimbing unit;

FIG. 27 is a side view of the cylinder assembly of FIG. 26, showing the same in extended position;

FIG. 28 is an enlarged longitudinal section of the cylinder assembly of FIGS. 26 and 27;

Figure 30:
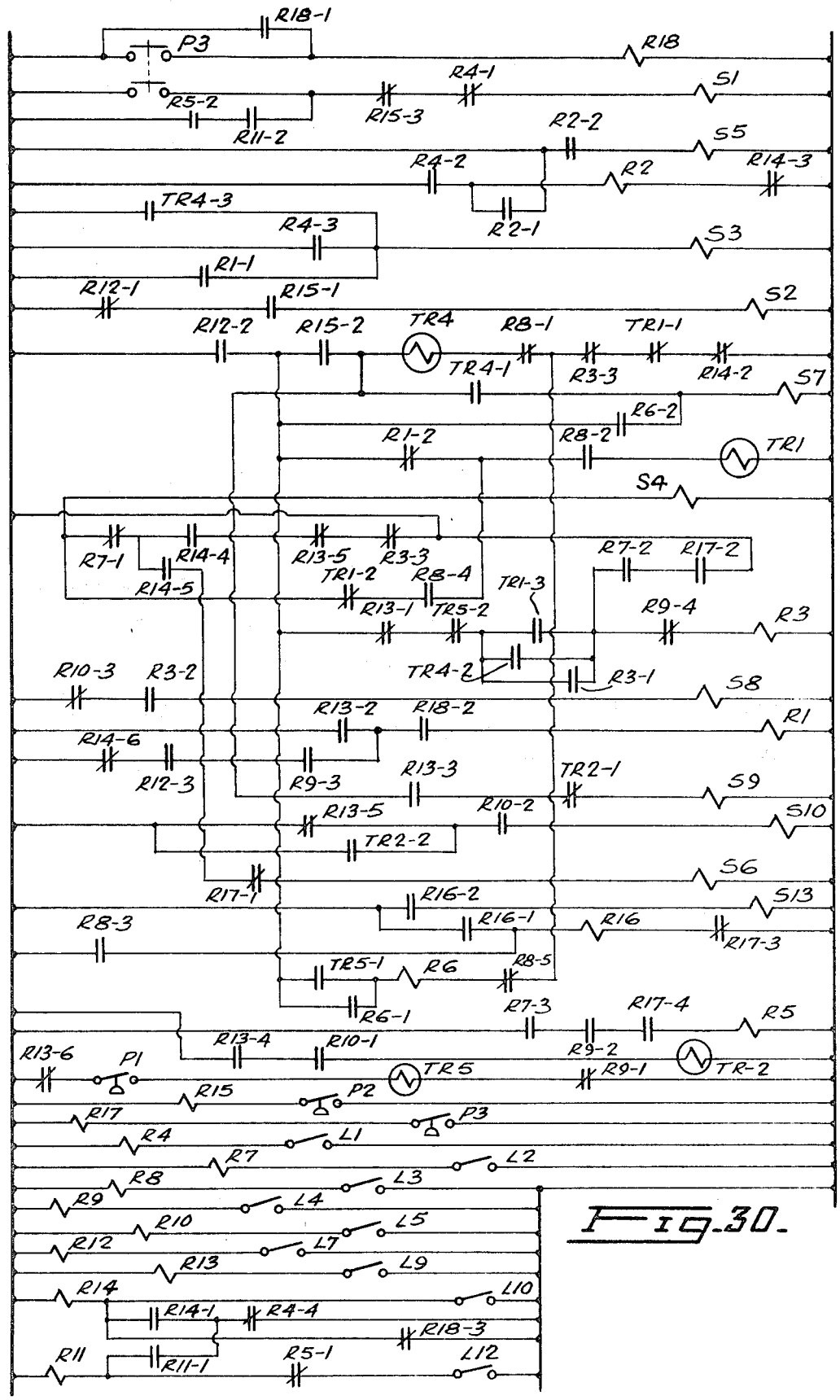
FIG. 30 is a circuit diagram demonstrating the operational sequence.

FIGS. 31a to e are fragmentary, diagrammatic views demonstrating the relationship between the circuit of FIG. 30 and the apparatus.

OVERALL CONSTRUCTION OF MACHINE

Figure 1:
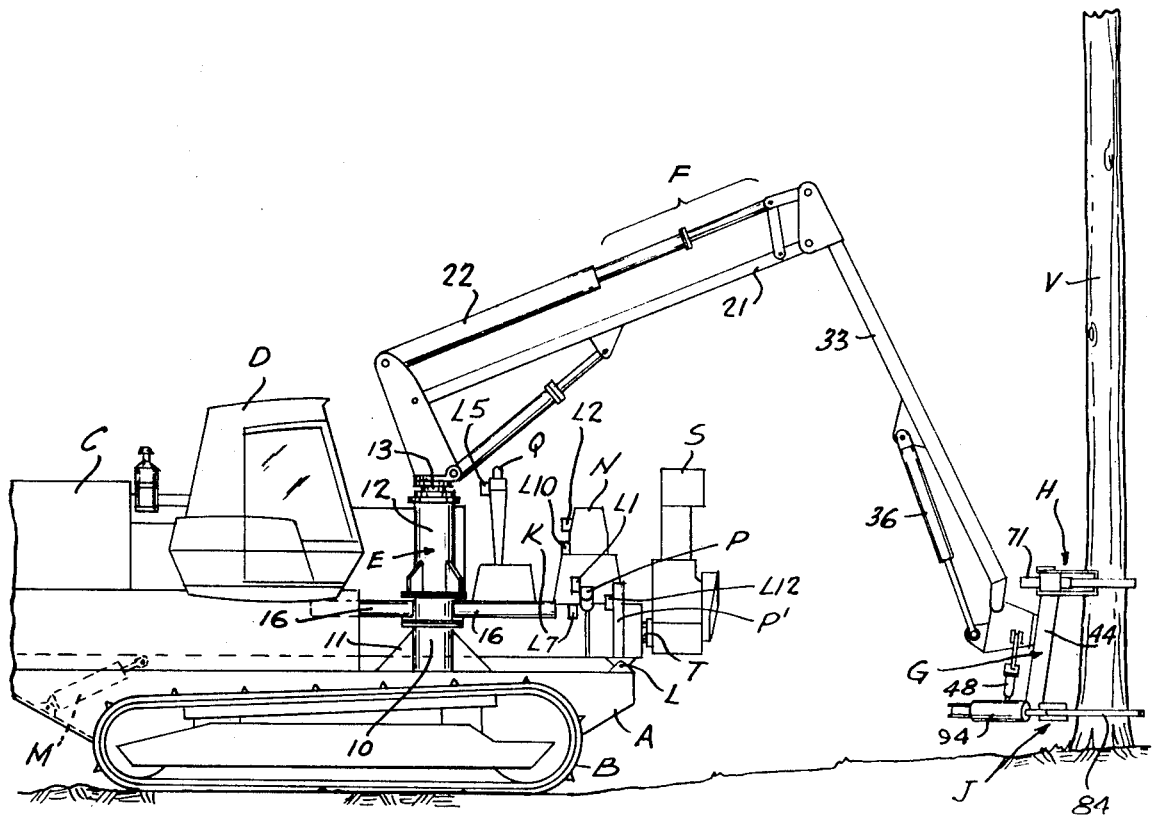
FIG. 1 is a general side view of the entire machine.
Figure 2:
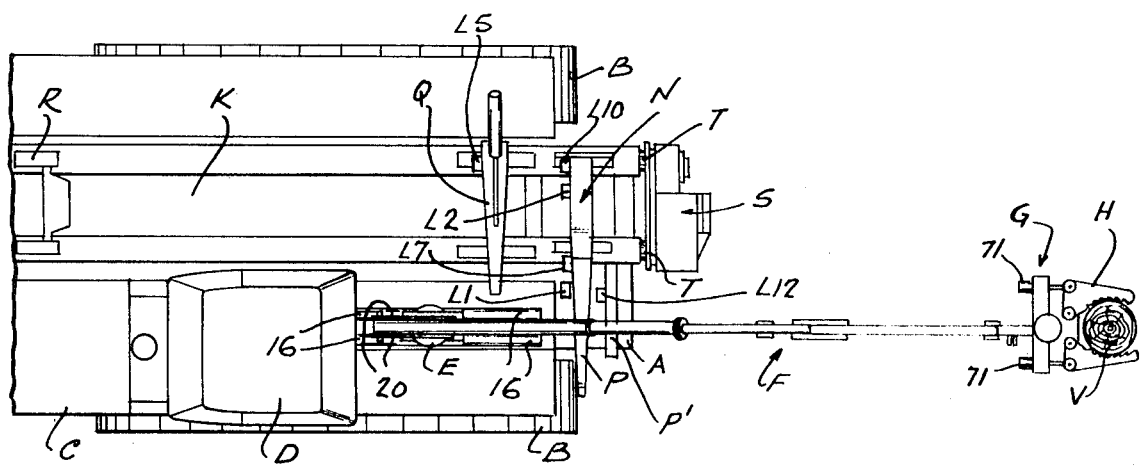
FIG. 2 is a plan view of the machine of FIG. 1.

The main portions of the timber-harvesting machine shown in FIGS. 1 and 2 include a chassis A mounted on the endless tracks B. A power assembly C mounted on the chassis A includes a diesel engine, hydraulic and pneumatic pumps and the necessary reservoirs for oil and air under pressure. The tracks B are driven by hydraulic motors (not shown), the entire machine being under control of a single operator who occupies a cab D.

A crane E is mounted forwardly of the cab D on one side of the chassis A and serves to support a boom F, on the remote end of which there is located a tree shear and clamp assembly G having, as its main components, a tree clamp H and a shearing device J.

A processing platform K is pivotally mounted at its front end on the chassis A by pivot pins L. The rear end of the platform K can be raised by means of hydraulic cylinders M to enable the rear of the platform K to be raised slightly and thus effectively to tilt its forward end downwardly to align the center line thereof and the mechanisms mounted thereon with a felled tree, one end of which rests on the platform and the other end of which rests on the ground.

Mounted at the front end of the processing platform K is a clamp N. Limit switches L2 and L10 detect the open and almost fully closed conditions respectively of the clamp N. A kicker arm P cooperates with the clamp N and a tree cradle P' is associated with the kicker arm P. Limit switches L1 and L7 respectively detect the up and down conditions of the kicker arm P, and a limit switch L12 detects a tree on the cradle P'. Mounted behind the clamp N on the processing platform K is a bucking shear Q, the fully open condition of which is detected by a held-open limit switch L5. At the rear end of the platform K there is located a butt plate assembly R. A delimbing unit S is situated forwardly of the front end of the processing platform K, being mounted on the ends of cylinder assemblies T.

CONSTRUCTION OF CRANE AND BOOM

Reference is now made to FIGS. 3 and 4 which show details of the crane E and boom F supported thereon. The crane E is mounted on the chassis A by means of a base post 10 reinforced by gusset plates 11. At the top of the base post 10 there is secured a further upwardly extending post 12 containing a shaft 13 on which the boom F is mounted. The shaft 13 is rotatable within the fixed structure of the crane E by means of a toothed wheel 14 secured to the end of the shaft, such toothed wheel 14 meshing with a pair of racks 15 that are slidable under the control of hydraulic cylinders 16. By means of these cylinders, the boom F can be rotated through any desired angle, which may be typically about 300° from one extreme position to the other. If a full 360° turn is required the crane must be extended to provide clearance, or can be mounted on the top of the cab D.

The boom F comprises a multiple plate structure 20 secured to the shaft 13, which plate structure 20 serves pivotally to support one end of a nonextensible beam 21 and also one end of an hydraulically operated telescoping member 22 extending generally parallel with the beam 21. At the remote end of the member 22 a pin 23 serves to connect it pivotally to one end of a link 24, the other end of which is pivotally secured by a pin 25 to the beam 21. The pin 23 also connects the member 22 to a second link 26 which is pivotally secured at its other end by a pin 27 to the top of a bracket 28. A lower part of the bracket 28 is pivotally connected by a pin 29 to the extreme end of the beam 21. Also supported by the plate structure 20 is an hydraulic cylinder 30, the piston 31 of which is connected by a bracket 32 to the beam 21.

Extending forwardly and downwardly from the bracket 28 is a further beam 33, on the lower end of which there is pivotally mounted by a pin 34 a positioning assembly 35 of the tree shear and clamp assembly G. A further hydraulic cylinder 36 connected at one end by a bracket 37 to the beam 33 has its piston 38 connected by a bracket 39 to the positioning assembly 35 to control the attitude thereof about the axis defined by the pin 34.

As appears from FIG. 10, the positioning assembly 35 consists of a pair of parallel plates 40 supporting bushings 41 and 42 which support a spindle 43 that projects beyond the ends of the plates 40 to pivotally support a post 44, the upper end of which is connected to the body 45 of the tree clamp H and the lower end of which is connected to the body 46 of the shearing device J.

As can best be seen from FIG. 12 the body 46 of the shearing device J includes on its upper surface a lug 47 to which there is connected one end of an hydraulic cylinder 48, the piston 49 of which is connected to a lug 50 that projects from one side of the positioning assembly 35 (FIG. 10). Inward and outward movement of the piston 49 will have the effect of causing the entire assembly G including the post 44 to rotate about the axis defined by the spindle 43, which axis is approximately horizontal.

CONSTRUCTION OF TREE CLAMP

The construction of the tree clamp H is illustrated in FIGS. 5 to 9. The body 45 of this clamp, which is mounted on the upper end of the post 44, consists essentially of a pair of parallel plates 60 interconnected by side portions 61 and by jaw pivot pins 62. The pins 62 define pivotal axes for two pairs of jaw members 63, 64, 65 and 66, the individual shapes of which are shown in FIGS. 8 and 9. Each of these jaw members has a hole 67 engaged by a pin 68 which serves to connect these members in pairs to a fork 69 on the end of a piston 70 of each one of a pair of hydraulic cylinders 71.

The upper left-hand jaw member 63 is provided with teeth 72 for substantially its entire length, while the lower left-hand jaw member 64 has no teeth. On the right-hand side of the jaw, the upper member 65 is formed with teeth 72, but it will be noted that the shape of the member 65 is similar to that of the member 64, that is, it is formed without an end portion corresponding to the end portion 73 of the member 63. This deficiency in the jaw member 65 is compensated for by the jaw member 66 which has an end portion 74 that also has teeth 72. Thus, as is apparent from FIG. 5, teeth 72 extend to substantially the extreme ends of the jaws on both sides. The majority of the teeth 72 (all except the few on member 66) are arranged in the same plane as each other, that is on the upper jaw members 63 and 65. This arrangement of the teeth directly opposite each other avoids any tendency of the tree clamp H, when closed on a tree, to exert a turning force on the tree tending to tip it to one side or the other. On the other hand, by virtue of the fact that the projecting portions 73 and 74 of the jaw members 63 and 66 lie in different planes, the jaws as a whole can overlap one another at their tips when moved to the extreme closed position embracing a small tree.

It will further be noted that the jaw members 63 and 65 carry interengaging teeth 76 to ensure that the two sides of the jaw close simultaneously and equally.

CONSTRUCTION OF SHEARING DEVICE

The details of construction of the shearing device J are shown in FIGS. 11 to 13a. The body 46 of this device is secured to the base of the post 44 by means of a flange 80, this body 46 consisting of a pair of spaced-apart, parallel plates 81 connected together at one end by a pair of pins 82, down the center by a gusset plate 46' and at the other end by a large pin 83 which also acts as a pivot pin for a pair of shear blades 84.

The shear blades 84 are made by taking a single sheet of metal and machining a shallow circular concavity in each surface. The boundary of this concavity on the visible side of the blades 84 is shown by the circle 86 in FIG. 11. It will be the same on the underside. The sheet is then cut down the middle, that is along the line on which the section of FIG. 12 is taken in FIG. 11. Cutting surfaces 87 are then formed on the separated edges. The result of this manner of manufacture is that the blades 84 taper in both directions: they taper inwardly towards their cutting edges along the central line on which the section of FIG. 13 is taken; at the same time they also taper along the cutting edges themselves from inner and outer points 88 and 89 on the circle 86 to a minimum width in the center at 90, as best appreciated from FIG. 12a. Each of the blades is then provided with vertically extending reinforcing bars 85.

On assembly, each of the blades 84 is connected by a pin 91 to a fork 92 secured to the end of a piston rod 93 of an hydraulic cylinder 94 the other end of which is secured to the body 46 by one of the pins 82.

The blades 84 pivot about the main pin 83 by means of a bearing structure consisting of a pair of bearing members 95 and 96 each connected to a respective blade 84. The bearing member 95 has a radially inward portion 97 that extends the full distance around the bearing assembly and an outer portion 98 that extends between ends 99 and 100 (FIGS. 11 and 13a). As shown in FIG. 13a, the outer portion 98 of the bearing member 95 projects down into the plane of a radially inward portion 101 of the other bearing member 96, which portion 101 corresponds to the portion 97 in that it extends around the full extent of the bearing assembly and is connected to an outer portion 102 that extends only between points 103 and 104.

This manner of constructing the bearing members 95, 96 has the effect of providing in a simple manner both circumferentially extending bearing surfaces 105 and 106, and radially extending bearing surfaces 107 and 108. The result is a bearing structure that is highly resistant to twisting, that is to say any tendency for the two bearing members 95 and 96 to be forced to positions in which they are no longer coaxial. It will be appreciated that the very high forces that must be exerted as the blades 84 are closed to cut through a tree may well give rise to such a tendency for the bearing members to twist, particularly if one of the blades should encounter a disuniformity in the shape or hardness of a portion of the tree.

OPERATION OF SHEARING DEVICE

The tapering of the blades 84 in the direction along their cutting edges (i.e. as seen in FIG. 12a) has the important advantage of overcoming the tendency that the pivotally closing blades would normally have of squeezing the tree out from between them. The portions of the blades 84 lying between the points 89 and 90 each have a taper extending along their cutting edges inwardly towards the respective point 90. This taper will exert forces 109 (FIG. 11a) on a tree being cut, such forces acting towards the point 90. Conversely, this effect may be looked upon as representing forces 110 acting on the shearing device J as a whole tending to pull it up firmly towards the tree. The taper on each blade between the points 88 and 90 tends to work in the opposite direction, i.e. to push the tree away (forces 111). The resultant is a tendency to center the tree around the central points 90 of the longitudinal blade taper, or at least to center the tree on some point not very far removed from the point 90 of each blade 84.

The construction and operation of this shearing device form the claimed subject matter of copending Canadian Pat. application of J. Boyd et al. Ser. No. 012,443 filed concurrently herewith.

OPERATION OF TREE SHEAR AND CLAMP ASSEMBLY

The operation of the tree shear and clamp assembly G mounted on the end of the boom F will be readily apparent from FIGS. 1 to 3. The operator will bring the vehicle to a suitable location adjacent a stand of trees. He will then control the crane E and its boom F by means of the various hydraulic cylinders already described. He will also ensure that the post 44 is in the correct attitude for the assembly G to embrace a selected standing tree V, such attitude being controlled by hydraulic cylinders 36 and 48. In this manner the assembly G is moved into an embracing position around the tree V with both its tree clamp H and its shearing device J in open condition. The jaws of the tree clamp H are then closed by means of the cylinders 71 to grasp the tree firmly, in the manner shown in FIG. 2. Next the cylinders 94 are operated to force closed the blades 84 of the shearing device J and cut through the tree. The blades 84 are now retained in their closed position so that they act as a support underlying the butt of the severed tree. The upper portions of the reinforcing members 85 immediately surrounding the butt of the tree may at the same time act as stops to limit sideways movement of the butt of the tree.

With the tree thus separated from its stump and still firmly held by the assembly G, the boom F and the positioning assembly 35 are manipulated to raise the tree slightly, move it towards the vehicle and then rotate it forwardly and downwardly to a substantially horizontal orientation with its butt overlying the kicker arm P on the processing platform K of the machine. With the tree in this position, the clamp H and shearing device J are reopened to allow the tree to drop a short distance down onto the kicker arm P and the tree cradle P' and thus take up the position shown in FIGS. 14 and 16, the boom F then being immediately returned by the operator to carry out a similar felling operation on a second tree V' while the first tree V is further processed on the platform K.

CONSTRUCTION AND OPERATION OF CLAMP AND KICKER ARM ASSEMBLY

As seen from FIG. 16, the kicker arm P is provided with an hydraulic cylinder 120, the first step in the operation of this assembly being expansion of the piston 121 of this cylinder 120, as demonstrated by FIG. 17, to raise the kicker arm P to throw the felled tree V onto a curved cradle surface 122 of the processing platform K.

The clamp N consists of a pivoted clamp arm 123 formed on its under side with teeth 124 and connected to a piston 126 of an hydraulic cylinder 125. FIG. 16 shows the clamp arm 123 in open position ready to receive the tree V, while FIG. 17 shows the clamp arm 123 closed to grip the butt end of the tree V tightly and hold it firmly.

The kicker arm P, which thus acts as tree transfer means, is immediately returned to its lower position to await a further tree.

CONSTRUCTION AND OPERATION OF DELIMBING UNIT

The delimbing unit S is shown in FIGS. 14 and 18 in its open position, and in FIGS. 15 and 19 in its closed position. It will be open while the events just described take place, so that, when the tree V is thrown across by the kicker arm P into the open jaw of the clamp N, it will also enter the delimbing unit S.

The delimbing unit S consists of a carriage 130 supporting an upstanding post 131 on which there is pivotally mounted by a pin 132 a curved arm 133, the position of which is controlled by an hydraulic cylinder 134 having a piston 135 connected to the arm 133. A flexible delimbing chain 136 extends between a fixed connection at 137 on the carriage 130 and a rotatably mounted, spring tensioned drum 138 mounted in the end of the arm 133. When the arm 133 is moved to its closed position (FIG. 19), the delimbing chain 136 is wrapped around the tree V, the spring associated with the drum 138 being stretched to tension the chain 136 and ensure that it embraces the tree firmly. The tree rests on a V-shaped support 139 that is formed with a sharp edge to aid in the delimbing function of the chain 136.

FIGS. 19a and 19b show views of a fragment of the chain 136, illustrating the rear edge 145 and the forward edge 148 characterized by delimbing teeth 146. The rear edge 145 of the chain contains spiked portions 147 that engage the tree to advance it through the machine during return movement of the delimbing unit.

This general type of delimbing unit is known, an example being described in T. N. Busch et al. U.S. Pat. No. 3,059,677 issued Oct. 23, 1962 (and the corresponding Canadian Pat. No. 642,108 issued June 5, 1962).

CONSTRUCTION AND OPERATION OF CYLINDER ASSEMBLIES FOR DELIMBING UNIT

The carriage 130 of the delimbing unit S is supported by connecting flanges 160 on the end of a pair of cylinder assemblies T housed in respective ones of a pair of channel frame members 162 of the processing platform K. These cylinder assemblies T are identical to each other and consequently only one has been shown in FIGS. 26 to 28, which views provide detailed illustration of this aspect of the machine.

Each assembly T includes a cylinder 161 that is slidingly supported in external bushings 164 mounted in a bushing housing 165 that is secured within a frame member 162. The cylinder 161 slides over a fixed piston 170 having a head 171 provided with packing 172 and a phenolic bushing 173. The piston 170 is secured at its end remote from the delimbing carriage 130 by means of a flange structure 174 to an anchor plate 175 that is secured by a bolt 176 to a fixed transverse member 177 extending across the end of the frame member 162.

An inlet conduit 178 for connection to a reservoir of high pressure air (not shown) communicates with the interior of sleeves 179 and 180 that extend along the inside of the piston 170 to a space 181 located between end surfaces 182 of the piston 170 and oppositely facing surfaces 183 of an end fitting 184 of which the flange 160 forms part. In this way, pressure air in the space 181 will have the effect of forcing the cylinder 161 to move outwardly, that is from the position shown in FIG. 26 to that shown in FIG. 27.

A further conduit 185 is provided for feeding pressure oil to the system, such oil being conducted along passageways 186 and 187 to pass through radially extending passageways 188 into a space 189 between the inner piston 170 and the outer cylinder 161. Here the oil bears against a surface 190 on a head portion 191 situated at the extreme inner end of the cylinder 161. Pressure oil in the space 189 will have the effect of tending to retract the sliding cylinder 161 from its FIG. 27 position to that of FIG. 26.

In the fully retracted position of the cylinder 161, the air space 181 is isolated from the interior of the sleeve 180 by an air cushion device comprising a plurality of metal discs 192 of gradually increasing diameter that are machined on a stem 193 projecting into the end of the sleeve 180 from the end fitting 184. It will be apparent that the discs 192 will tend to cause the formation of an air cushion in the space 181 during the final inward travel of the cylinder 161. Limit switches L3 and L4 respectively detect the extreme positions of the head 191.

The power assembly C includes a reservoir for high-pressure air and, when it is desired to move the delimbing unit S out along a tree V in the manner demonstrated in FIG. 20, the air pressure that is constantly maintained in the sleeves 179, 180 in the fixed piston 170 is permitted to force the cylinder 161 outwardly. It is possible in this way to achieve a very rapid travel of the delimbing unit S along the tree V to perform a delimbing operation, since the inertia of the unit S is comparatively small and the compressed air in the assembly is immediately available to provide the driving force. It is not necessary to wait for additional air to be pumped into the system.

To retract each cylinder 161, oil is admitted under pressure to the space 189 to overcome the force of the air pressure and thus to move the delimbing head S back towards the machine. This return movement takes place more slowly than the outward movement. As will appear from the description below, the unit S is required to move the mass of the tree during this return stroke, so that larger forces are required for this reason as well as to overcome the air pressure. For these reasons it is convenient to control such return movement with oil at relatively high pressure. Due to the relative smallness of the space 189, a relatively small volume of oil at high pressure is required to overcome the force of the air pressure to retract the delimbing unit S. During this return movement, the air within the fixed piston 170 and the reservoir attached to it will build up again in readiness for the next outward stroke. When such further outward stroke is desired, the oil pressure in the space 189 is suddenly released, allowing the air to take charge again and move the delimbing unit S outwardly, the relatively small volume of oil requiring to be displaced from the space 189 at this time also contributing to the speed with which this outward stroke can be achieved.

The construction and operation of these cylinder assemblies for the delimbing unit form the claimed subject matter of copending Canadian Pat. application of J. Boyd et al. Ser. No. 012,441 filed concurrently herewith.

CONSTRUCTION AND OPERATION OF BUCKING SHEAR AND BUTT PLATE ASSEMBLY

With the butt end of the tree V firmly held by the clamp N, as shown in FIG. 20, the delimbing unit S is forced rapidly out along the tree to remove limbs therefrom.

The next operation is to relax the grip of the clamp N and initiate a return stroke of the delimbing unit S when the spiked portions 147 on the rear edge of the chain 136 will bite into the tree to hold it firmly, so that during this return stroke the tree is drawn into the machine in the manner demonstrated by FIG. 21. The throw of the delimbing unit S is such that this movement of the tree V will cause its butt to strike against the butt plate assembly R situated at the rear end of the platform K, which assembly R consists of a plate 200 that is mounted on pins 201 pivotally supported on posts 202 projecting upwardly from the frame members 162. A limit switch L9 detects a predetermined swinging movement of the plate 200 and is connected to arrest travel of the tree, to actuate the bucking shear Q and simultaneously to retighten the clamp N, upon detection of such predetermined movement. In practice a swinging movement of the plate 200 of only a few degrees will trigger the switch L9, and this plate will not move as far as its broken line position. Such position has been shown to demonstrate that the plate 200 is free to continue its swing, indeed even until it is horizontal, in order to allow free travel for the tree in the event of malfunction of the travel-arresting controls.

Details of the shear Q are shown in FIG. 24. It consists essentially of a bucking blade 205 pivoted about a pin 206 in a frame 207 mounted on and above the frame members 162 by bolts 208. The blade 205 is connected to a piston 209 of an hydraulic cylinder 210 that is also mounted on the frame 207. On actuation the bucking shear Q cuts a bolt length from the tree V.

DISPOSAL OF BOLTS

The portion of the processing platform K between the bucking shear Q and the butt plate assembly R has no floor. The freshly cut bolt of timber thus falls through the processing platform K between the frame members 162 into a storage compartment 212 (FIG. 25) having a trap door type of flap 213 operated by a hydraulic cylinder 214. In this way a few bolts can be accumulated and then dumped together at a selected location.

As alternatives to this latter arrangement, the storage compartment 212 may be dispensed with altogether, so that the cut bolts fall immediately onto the round for subsequent skidding out of the bush by another vehicle, or the compartment 212 may include known devices for wiring a number of bolts together in a bundle before dumping them to facilitate their subsequent removal.

Even before the bolt has dropped down into the compartment 212, processing of the second bolt will have already begun, the second outward stroke of the delimbing unit S being initiated as soon as the clamp N has been retightened, and taking place simultaneously with the bucking and disposal operations.

OVERALL OPERATION OF MACHINE (GENERAL)

The overall operation of the machine is as follows:
 i. The operator causes the tree shear and clamp assembly G to embrace a first tree and cut through it.
 ii. The operator causes the boom F to place the tree in horizontal orientation with its butt on the kicker arm P and tree cradle P'.
 iii. The operator initiates a processing sequence. Since this sequence is always the same, it can readily be programmed in the control mechanism. As a result the operator need merely press a processing start button; he is then free to return his attention to the boom.
 iv. The operator returns the boom F to fell a second tree while the first is being processed on the platform K.

v. The kicker arm P moves the tree into the clamp N and delimbing unit S and these units close.
vi. The delimbing unit S is driven out along the tree to delimb a first length thereof.
vii. The arm of the clamp N is opened slightly to release the tree.
viii. The delimbing unit S is retracted to move the delimbed portion of the tree back along the processing platform K.
ix. The butt plate assembly R is struck by the tree to trigger the bucking shear Q to cut a bolt from the tree.
x. The bolt is disposed of by being allowed to fall through the processing platform K to the ground or temporary storage in the machine.
xi. Simultaneously with the bucking and disposed steps, the arm of the clamp N is retightened and the delimbing unit S is again driven out along the tree to delimb a second length thereof.
xii. The delimbing unit S is again retracted and a second bolt bucked by the bucking shear.
xiii. The processing steps are repeated until, when a preset top diameter has been reached, the tree top is ejected to the side by the delimbing unit opening.

Since the various feed lines extending to the numerous hydraulic cylinders and the valves controlling the pressures in such feed lines are conventional, no attempt has been made to illustrate such parts in the drawings.

OVERALL OPERATION OF MACHINE (DETAILS)

In general, the operation of the vehicle itself and the crane E with the boom F and other devices mounted thereon will be individually controlled manually by the operator. Since such controls merely involve the use of hydraulic valves regulating the supply of pressure fluid to the various hydraulic cylinders which have already been described and which are conventional in operation, no further detailed discussion of these parts in deemed necessary.

The processing sequence carried out on the platform K is preferably carried out automatically to enable the operator to return his attention to the boom F for the felling of a second tree while the first tree is being processed on the platform K. Nevertheless, provision will normally be made for carrying out any one of the processing steps manually to provide full control in the event of failure of one part of the system. However, since again such manual controls will be simple and conventional, no details will be given herein, it being deemed more useful to provide a description of the manner in which the automatic processing sequence is carried out after the operator has pressed the start button and returned his attention to the boom F.

The control circuit for the automatic processing sequence is shown in FIG. 30, and FIGS. 31a to 31e provide a number of fragmentary diagrammatic views that serve to interrelate the circuitry of FIG. 30 with the apparatus that has already been described and illustrated and more specifically with the hydraulic operating cylinders thereof.

Once the tree has been placed on the kicker arm P (FIG. 14) the operator presses the start button P3 (FIG. 30). The start button P3 has a first pair of contact that energize a relay R18 having a pair of normally open contacts R18–1 that render this relay self-holding. A second pair of contacts of the start button P3 energize a solenoid S1 which, as seen in FIG. 31a, serves to admit hydraulic fluid to the lower end of the cylinder 120 to raise the kicker arm P to throw the tree V into the clamping and delimbing assemblies, i.e. from the position shown in FIG. 16 to that of FIG. 17.

Figure 31A:
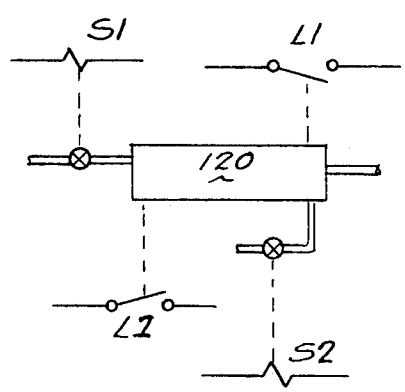

As also diagrammatically shown in FIG. 31a, when the kicker arm P has reached its top position, a limit switch L1 is closed to energize a relay R4 which opens a pair of normally closed contacts R4–1 to deenergize the solenoid S1. A pair of normally open contacts R4–2 are closed to energize a relay R2 which is self-holding by virtue of its normally open contacts R2–1.

It should be remarked in connection with FIGS. 31a to e that, in order that the various limit switches could be included in these views, they have been diagrammatically shown as associated with the movement of the various cylinder pistons, whereas in practice they are in most instances associated with the mechanisms controlled by such pistons, and are proximity switches as can be appreciated from FIGS. 1 and 2.

Figure 31B:
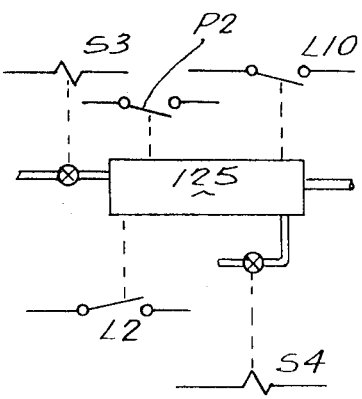
Figure 31C:
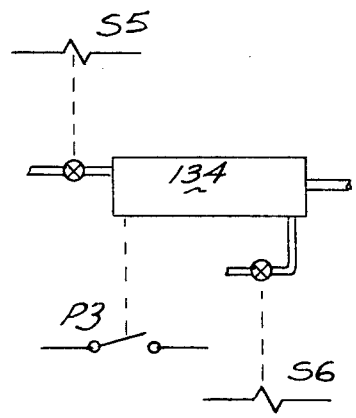

Simultaneously, a further pair of normally open contacts of the relay R4, i.e. contacts R4–3, are closed to energize a solenoid S3 which, as is indicated diagrammatically in FIG. 31b, serves to control the admission of hydraulic fluid to the lower end of the cylinder 125 that closes the clamp N (FIG. 17). At the same time, a second pair of normally open contacts of the relay R2, i.e. contacts R2–2, are closed to energize a solenoid S5, which, as seen in FIG. 31c, controls admission of hydraulic fluid to the lower end of the cylinder 134 that moves the delimbing unit S to its closed position (FIG. 19). As a result, the clamp N and the delimbing unit S close securely around the tree V, the solenoid S5 remaining energized during the whole main portion of the cycle to ensure that the delimbing chain 136 remains firmly embracing the tree.

When the clamp N has been firmly closed against the tree, the pressure in the lower end of its hydraulic cylinder 125 will rise sufficiently to trip a pressure switch P2 which is thus closed to energize a relay R15, normally open contacts R15–1 of which thereupon energize a solenoid S2 which, as diagrammatically shown in FIG. 31a, admits hydraulic fluid to the other end of the kicker arm cylinder 120 so as to lower the kicker arm P to its original position. This movement releases the limit switch L1 which in turn releases the relay R4 to deenergize the solenoid S3. However, hydraulic pressure remains trapped between the valve controlled by the solenoid S3 and the piston associated with the cylinder 125 so that the clamp N remains firmly closed and the pressure switch P2 also remains closed.

Figure 31D:
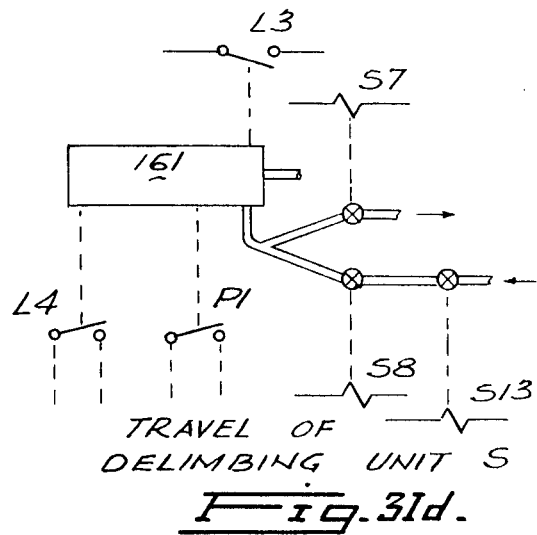

As soon as the kicker arm P reaches its lowered position, a further limit switch L7 is closed to energize a relay R12, a pair of normally closed contacts R12–1 of which then deenergize the solenoid S2. At the same time a pair of normally open contacts R12–2 close to actuate a time relay TR4 (contacts R15–2 of energized relay R15 being closed), a pair of instantaneously operating contacts TR4–1 of which thereupon energize a solenoid S7 that, as seen in FIG. 31d, controls the cylinders 161. As has already been explained, the control of the delimbing cylinders 161 is complex in that expansion of these cylinders is brought about not by the application of a pressure but by the release of their hydraulic pressure to enable the pneumatic pressure to take charge. The solenoid S7 thus causes outward travel of the delimbing unit S to perform a delimbing operation (FIG. 20) and at the end of this stroke, a limit switch L3 is closed to energize a relay R8, thus opening a pair of normally closed contacts R8–1 and disconnecting the relay TR4 again to thus deenergize the solenoid S7. At the same time a pair of normally open contacts R8–2 close a circuit to a second time relay TR1 (through now closed contacts R12–2) which relay is consequently energized. Further normally open contacts R8–3 are also closed to energize a relay R16 which is self-holding by virtue of its contacts R16–1. Contacts R16–2 also close to energize a solenoid S13 which now acts (FIG31d) to connect the accumulator (not shown) of hydraulic fluid under pressure to the hydraulic circuit of the cylinders 161 in readiness for the return stroke of the delimbing unit S.

The timing relay TR1 has contacts TR1–1 that open instantaneously; contacts TR1–2 that are timed to open after a given interval; and contacts TR1–3 that are timed to close after a given interval slightly longer than the interval of contacts TR1–2. Contacts TR1–1 thus open immediately to deenergize the relay TR4 which in turn opens the circuit to the solenoid S7 through its instantaneous contacts TR4–1.

It will be recalled that relay R8 has just been energized, and this relay has a further pair of contacts R8–4 that through normally closed contacts TR1–2 establishes an energizing circuit to a solenoid S4. The relay TR1 is however simultaneously energized and its contacts TR1-2 are timed to open shortly thereafter so that the solenoid S4 that controls admission of fluid to the remote end of cylinder 125 is only briefly energized to effect partial opening of the clamp N. Although not specifically shown in FIG. 31d opening of the remote end valve by solenoid S4 must simultaneously release the valve at the other end of the cylinder in accordance with standard practice. In reality these valves will form a single valve mechanism.

Normally open contacts TR1-3 close after a slightly longer time to actuate a relay R3 which is self-holding by virtue of its contacts R3-1 and which also has normally open contacts R3-2 that energize a solenoid S8. This solenoid controls admission of hydraulic fluid to the cylinders 161 (FIG. 31d), initiating the return travel of the delimbing unit S . This movement reopens the limit switch L3 thus releasing the relay R8 so that time relay TR1 is released by contacts R8-2.

Near the end of this return stroke during which the delimbed portion of the tree is propelled along the platform K the butt plate assembly R is struck by the tree to actuate the limit switch L9 (FIG. 23) and thus energize a relay R13. Normally closed contacts R13-1 are thus opened to deenergize the relay R3 which in turn deenergizes the solenoid S8 at contacts R3-2 to stop travel of the delimbing unit S at a normal retracted position which is not quite as far inwards as the fully retracted position. At the same time normally open contacts R13-2 close to energize a relay R1, since contacts R18-2 of the initially energized relay R18 will also be closed.

Figure 31E:
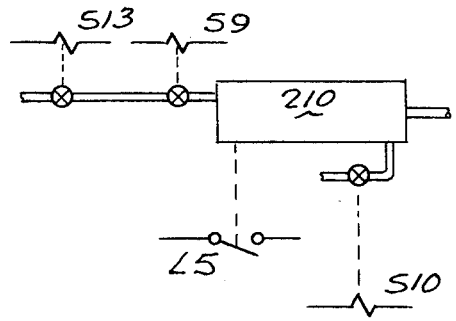

Energization of the relay R1 closes its contacts R1-1 to reenergize the solenoid S3 and reclose the clamp N. When the clamp N has reclosed, the pressure switch P2 is reclosed to reactuate the relay R15. Contacts R15-2 now complete a circuit through contacts R12-2 (since relay R12 is still energized) and contacts R13-3 to energize a solenoid S9 that controls the admission of hydraulic fluid to the remote end of the cylinder 210 which operates the bucking shear Q(FIG. 31e). It will be noted that, since the solenoid S13 is still energized, hydraulic fluid pressure is made available for this purpose. The closing of contacts R15-2 also reenergize the time relay TR4, the instantaneously operating, normally open contacts TR4-1 of which now reenergize solenoid S7. As a result, the operation of the bucking shear Q and the second delimbing stroke of the delimbing unit S take place simultaneously as mentioned under the general operation step (xi) described above.

Movement of the bucking shear cylinder 210 allows a limit switch L5 to close to energize a relay R10 and thus close its normally open contacts R10-1 which, together with now closed contacts R13-4, energizes a further time relay TR2.

It may be noted in passing that, should the hydraulic pressure in the clamp circuit drop below a safe value, the pressure switch P2 will open. This will open the relay R15 to halt both the bucking shear operation and further advancement of the delimbing unit, the bucking shear being rendered ineffectual by deenergization of solenoid S9 through contacts R15-2, and the advancement of the delimbing unit being prevented by deenergization of the solenoid S7 through the same pair of contacts.

As previously indicated, the relay R10 actuates the time relay TR2 which is timed to repeat the shearing cycle, if the tree cannot be cut with a single stroke. This effect is achieved by the relay TR2 which is timed, after a short period, to open its normally closed contacts TR2-1 to deenergize the closing solenoid S9, and to close its contacts TR2-2 to energize the opening solenoid S10, and then to reverse the condition of these solenoids, and to repeat this cycle until the tree has been cut through. This latter event will be detected by the severed log falling, as indicated in FIG. 25, and thus releasing the butt plate R so that the limit switch L9 deactivates the relay R13. The relay R13 in turn deenergizes the solenoid S9 (contacts R13-3); the time relay TR2 (contacts R13-4); and the relay R1 (contacts R13-2); and energizes a solenoid S10 through a pair of normally closed contacts R13-5, contacts R10-2 of the relay R10 now being closed.

The solenoid S10 controls admission of hydraulic fluid to the remote end of the bucking shear to return the same to its open position, whereupon the limit switch L5 is reopened to deactuate the relay R10 and thus the solenoid S10 through contacts R10-2. During the performance of the bucking shear operation, the delimbing unit was programmed to travel out for a second delimbing operation, repeating the operation described above. As before, the clamp N can be relaxed by brief operation of the solenoid S4 once the relay R1 has been deactivated and its contacts R1-2 have thus reclosed. The delimbing unit will then be retracted by operation of the solenoid S8 under control of the relay TR1 as already described, but this action can only take place after the relay R10 has been deactivated, i.e. on closing of it is contacts R10-3. The relay R10 will, of course, be deactivated by reopening of the limit switch L5 on return of the bucking shear Q to its retracted position.

It should be noted that, if the bucking shear cycle is completed before the delimbing cylinders 161 are fully extended, the delimbing cycle will continue uninterruptedly and the solenoid S8 will eventually, after the time delay and relaxation of the clamp N, return the delimbing unit S to its withdrawn position to feed another section of the tree through the processing platform.

On the other hand, should the delimbing unit S have reached its extreme projected position before the bucking shear cycle is entirely complete, further operation of the delimbing cycle will be temporarily arrested until the bucking shear cycle is complete. This effect is achieved by the fact that until the bucking shear cycle is complete the limit switch L5 will be closed which will cause the relay R10 to be energized. The contacts R10-3 will thus remain open to prevent reenergization of the solenoid S8 which controls the return movement of the delimbing unit.

The foregoing cycles continue to repeat themselves until the tree measures 3 inches in diameter or less, which fact is detected by a limit switch L10 located at the clamp N and arranged to detect the extent of depression thereof, as represented diagrammatically in FIG. 31b. Limit switch L10 actuates a relay R14 which contains self-holding contacts R14-1, such self-holding effect assuming that the contacts R4-4 are closed, i.e. the relay R4 is not energized by virtue of the limit switch L1 being open (i.e. the kicker arm is down). The same condition enables self-holding contacts R11-1 of a further relay R11 to remain closed, the relay R11 being initially energizable by a limit switch L12 which detects the weight of a further tree on the tree cradle P'.

The limit switch L10 will detect the small size of the tree, when the delimbing unit S is in its normal retracted position with the tree bearing against the butt plate assembly R, because, during the immediately preceding travel of the tree along the processing platform the clamp N will have been slightly raised to allow such travel. The relay R14 through a pair of its normally closed contacts R14-2 now isolates the timing relay TR4, thus preventing further energization of the solenoid S7 and further extension of the delimbing unit S. In addition, the relay R14, through a pair of normally closed contacts R14-3 now isolates the relay R2 which in turn deenergizes the solenoid S5 which up till now has been held closed retaining the delimbing chain firmly around the tree.

The bucking shear Q is also operated by the solenoid S9 as before. The log drops, the butt plate R is released and the bucking shear Q is reopened by solenoid S10, the limit switch L9 on the butt plate R reopening to deactivate the relay R13, and the limit switch L5 on the bucking shear reopening to deactivate the relay R10. The release of the relay R13 allows its normally closed contacts R13-5 to reclose and, since contacts R14-4 of relay R14 are now closed, to complete an energizing circuit to the solenoid S4 to reopen the clamp N. At the same time a circuit is established to a solenoid S6 through contact R17-1, R14-5; R14-4; R13-5 and R3-3, to energize this solenoid which, as shown in FIG. 31c, serves positively to reopen the delimbing unit S.

The clamp N and the delimbing unit S are now both fully open so that the tree top is positively ejected from the system. Opening of the clamp N causes closing of a limit switch L2 which actuates a relay R7 having normally closed contacts R7-1 that now serve to deenergize solenoid S4. Opening of the delimbing unit S causes closure of a pressure switch P3 which in turn results in actuation of a relay R17, the normally closed contacts R17-1 of which now deenergize the solenoid S6. This deenergization of solenoids S4 and S6 thus leaves the clamp N and delimbing unit S ready for subsequent reenergization.

Relays R7 and R17 have respective contacts R7-2 and R17-2 that are now closed to complete a circuit to energize the relay R3 which, as previously indicated, is self-holding by virtue of its contacts R3-1. Its other contacts R3-2 reenergize the solenoid S8 to move the delimbing unit S from its normal retracted to its fully retracted position.

The relay R17 through normally closed contacts R17-3 deactivates the relay R16 which, through its contacts R16-2, deenergizes the solenoid S13. This solenoid now cuts off supply of hydraulic pressure from the cylinders controlling travel of the delimbing unit S and operation of the bucking shear Q (FIGS. 31d and 31e). Since the delimbing unit S is now in its fully retracted position, its limit switch L4 is closed, and it will be seen that this limit switch energizes a relay R9 that opens normally closed contacts R9-1 to isolate a time relay TR5, although a pressure switch P1 is closed at this time by virtue of the hydraulic pressure in cylinder 161. Relay R9 also isolates relay R3 at this time by its contacts R9-4, so that the solenoid S8 cannot be actuated. Relays R7, R9 and R17 are now all closed, thus closing their respective contacts R7-3, R9-2 and R17-4 to complete a circuit to a relay R5.

If there is no further tree on the tree cradle P' ready for the kicker arm P at this moment, i.e. limit switch L12 open, the cycle will stop, because contacts R5-1 will open to isolate the relay R11. On the other hand if there is a waiting tree causing the limit switch L12 to be closed, the relay R11 which is self-holding will already have been energized prior to energization of the relay R5 and opening of its contacts R5-1. In these circumstances both the relays R5 and R11 will be energized simultaneously to close their respective contacts R5-2 and R11-2 to reestablish a circuit to the cycle-initiating solenoid S1 that was originally closed by the manual switch P3. This automatically starts a fresh cycle, provided that contacts R15-3 are closed, which requires deenergization of the relay R15 as a result of absence of closing pressure on the clamp N, i.e. confirmation that the clamp N is open and ready to receive another tree thrown into it by the kicker arm P.

This fresh upward movement of the kicker arm P closes its limit switch L1 to energize the relay R4, contacts R4-4 of which then deenergize the relays R11 and R14. A short time later when the clamp N and delimbing unit S have closed around the new tree, limit switch L2 has opened to deenergize the relay R7, and pressure switch P3 has opened to release the relay R17.

The reason why it is necessary to provide for manual restarting of the processing cycle if there is no tree waiting for the kicker arm P when the previous cycle ends, is to avoid the second cycle commencing automatically as soon as a fresh tree is dropped by the boom F, which sudden commencement of a new cycle, beginning as it does with upward movement of the kicker arm and the new tree, might well foul the tree clamp and shear assembly G, before the operator could move these clear of the position immediately above the kicker arm.

An abnormal situation that can be encountered is for the delimbing unit to have slipped along the tree during the return stroke so that the portion of the tree fed along the platform is too short to reach the butt plate R. In this case the delimbing cylinder 161 will reach its fully retracted position. It will be appreciated that this does not happen during a normal cycle, because the limit switch L9 energizes the relay R13 to deenergize the solenoid S8 and halt the delimbing unit at its normal retracted position slightly short of the full retracted position. However, under the abnormal conditions mentioned, the limit switch L4 is closed without the limit switches L9 or L10 having been closed. Thus the relay R9 is energized, while relays R13 ad R14 are not. The relay R9 has a pair of contacts R9-3 that now completes an alternative circuit to the relay R1 that was previously energized through contacts R13-2. This alternative circuit also includes normally closed contacts R14-6, and normally open contacts R12-3 that are now closed because the relay R12 is energized by the limit switch L7. Thus the relay R1 is energized to reactuate the solenoid S3 and reclose the clamp N, but because the contacts R13-3 are now open the solenoid S9 cannot be actuated to operate the bucking shear. However, the time relay TR4 is still energized through the action of the pressure switch P2 and the relay R15, so that the delimbing unit is moved out again to repeat the cycle. On the next return stroke the tree can be expected to reach the butt plate, probably after only a portion of the return stroke has been carried out, and this action will serve to return the system to its normal cycling.

If for some reason the return stroke of the delimbing unit should be delayed beyond a reasonable time (perhaps by reason of the tree having been crooked and having jammed), the time relay TR5 comes into effect. With hydraulic pressure in the cylinders 161, causing closing of the pressure switch P1, but without energization of either the relay R9 by the limit switch L4 or the relay R13 by the limit switch L9, the relay TR5 is energized through contacts R9-1 and R13-6. If this relay is not released after a certain time by closing of one of these limit switches, timed contacts TR5-1 close to energize a relay R6 having self-holding contacts R6-1. This energization of the relay R6 presupposes that relay contacts R12-2, R8-5, R3-3, TR1-1 and R14-2 are all closed by virtue of energization of relay R12 and deenergization of relays R8, R3, TR1 and R14.

The relay R6 has normally open contacts R6-2 that now complete a circuit to the solenoid S7 to release hydraulic pressure in the cylinders 161 and thus extend them again. The relay TR5 also has a pair of normally closed contacts TR5-2 that are timed to open at the same time as contacts TR5-1 close, the contacts TR5-2 ensuring that the relay R3 cannot be energized to actuate the solenoid S8 at this time. Of course, as soon as the solenoid S7 releases the cylinder pressure, the pressure switch P1 opens to isolate the relay TR5 again, so that, when the delimbing unit reaches its outermost position again the reclosing of the limit switch L3 will initiate a cycle of the relay TR1 and the apparatus will try a second time to feed the tree onto the processing platform.

The relay TR4 performs a similar monitoring function in relation to the outward stroke of the delimbing unit. Should this movement be delayed, so that the limit switch L3 does not energize the relay R8 to disconnect the relay TR4 within a specified time, its delay-acting contacts TR4-2 close to complete a circuit to the relay R3 to energize the solenoid S8 to return the delimbing unit and isolating the relay TR4 at contacts R3-3.

Contacts TR4-3 close after the same delay interval to energize the solenoid S3 to ensure full pressure of the clamp N at this time, so that during this return motion of the delimbing unit there is no chance of the tree being fed along the processing platform.

Normally closed contacts R18-3 energize the relay R14 when the relay R18 is deenergized, i.e. before a cycle starts, in order to open the contacts R14-3 and thus ensure that the relay R2 which operates the solenoid S5 is deenergized at this time. This is necessary because otherwise the solenoid S5 would close the delimbing unit S.

ADVANTAGES OF OPERATING CYCLE OF MACHINE

It is proposed now to discuss the sequence of steps that the present machine performs in relation to the advantages that this particular sequence affords, more especially in comparison with the operating cycles of other timber harvesting machines that have been suggested in the past.

The most important advantage of the present machine is believed to reside in the combination of two features:

a. The ability to achieve a shorter effective operation cycle, that is to say, the ability to fell, delimb and buck more trees per hour than any known machine of comparable size and cost, and b. the ability to achieve this speed of operation without sacrifice of other desirable features, the principal one of which is the provision of a relatively small and light machine that is comparatively cheap to build and operate and that can operate reliably on very rough terrain and in confined spaces.

This advantage is achieved by the combination and cooperation in the structure of the present machine of two essential elements, these being the extensible boom that can reach out from the vehicle to fell and transport back to the processing platform tree after tree without the need to move the vehicle repeatedly to bring it alongside each tree, combined with a processing platform having the processing instrumentalities thereon (clamp, delimbing unit, butt plate and bucking shear), which processing instrumentalities are thus separate from and independent of the boom which caries the tree shear and clamp assembly. In this way the two operations of felling and processing can be carried out independently and simultaneously, which is a very significant advantage in terms of cycle time.

Figure 29:
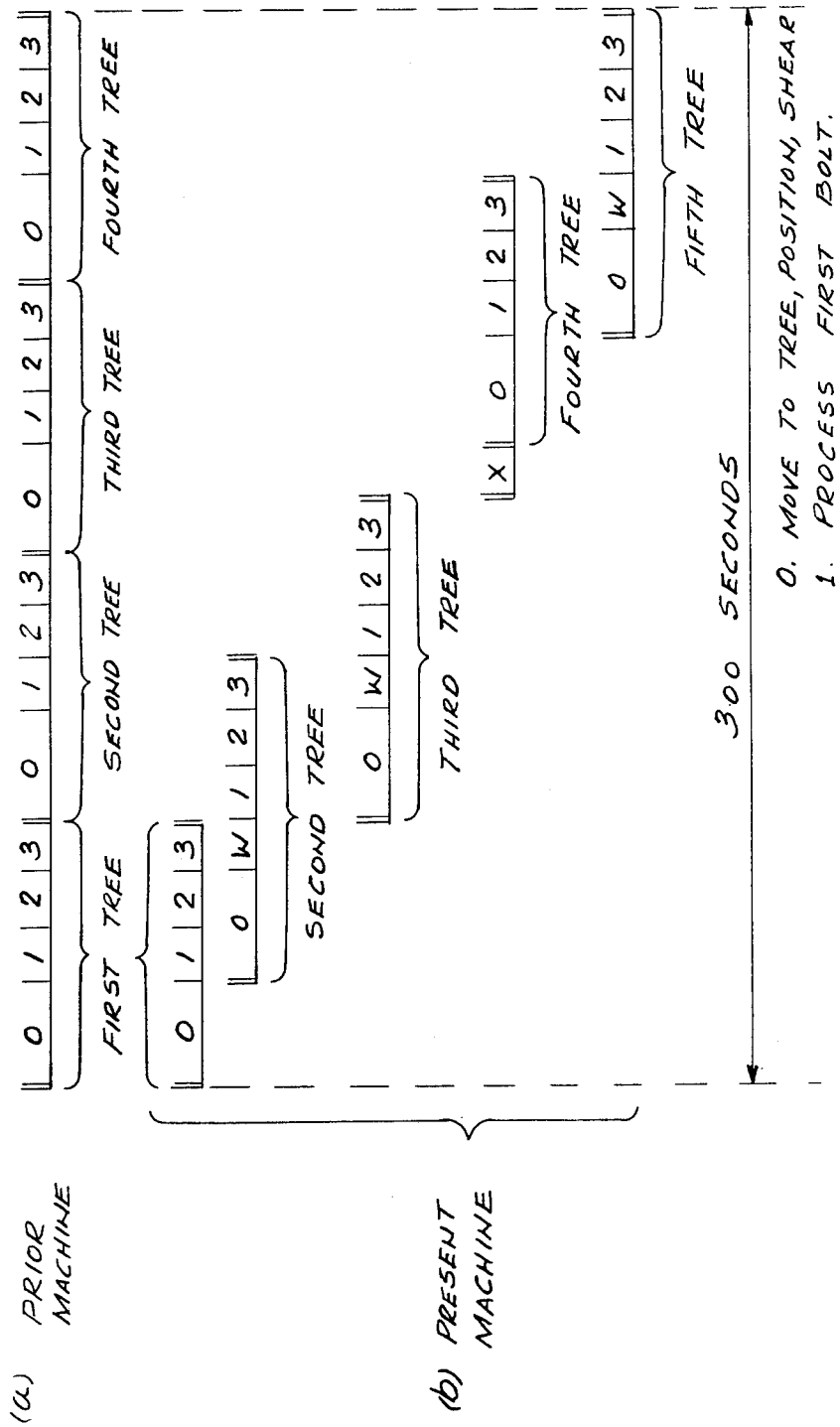
FIG. 29 is a chart demonstrating an operational advantage of the machine of FIGS. 1 to 28.

By way of further demonstration of this advantage, FIG. 29 provides a chart comparing the operating cycle of the present machine with that of a typical prior art machine. For purposes of comparison it has been assumed in this chart that the two machines both require typically thirty seconds to move up into alignment with a tree and fell it. This period is identified as 0 in FIG. 29. In reality, the present machine will have an additional advantage in this respect, in that it will normally be a quicker and easier operation for an operator to bring a boom into engagement with a tree than to bring the vehicle itself up alongside the tree. This is especially true in rough terrain. However, for the present purpose of merely demonstrating the advantage of the overlapping nature of the present process, this other advantage has been ignored, the preliminary step being assumed to be the same in the two machines and to occupy 30 seconds. It has also been assumed in that each machine will require approximately 15 seconds to delimb, advance, buck and dispose of each bolt (identified in FIG. 29 as 1, 2 and 3 for the three bolts respectively), although again the present machine is believed to have advantages in respect of delimbing time that will be discussed separately below. Assuming in each case three bolts per tree, and ignoring minor time factors such as that for rejecting the tree tops, which factors will tend to be about the same for both machines, FIG. 29a shows a total time of 300 seconds for felling and processing four trees with the known machine, in which no provision is made for overlap of cycles. By contrast, FIG. 29b shows the felling and processing of five trees by the present machine in the same time, including an allowance of 15 seconds, shown at X, for moving the vehicle to a new stand of trees after three have been felled and processed, an operation that will normally not be required so often, since the boom can normally be expected to reach more than three trees from each position of the vehicle. The greater the number of trees it can reach before requiring to be moved, the greater the saving of time achieved by the overlapping feature, because it will be noted that the operator has been assumed to have waited for completion of the entire processing of the third tree before moving the machine, although in practice this may not always be necessary, especially in relation to the processing of the third bolt. The periods marked W represent waiting periods during which the felled tree is waiting on the kicker arm for the processing platform to be ready to receive a fresh tree.

Another advantage of the present machine is that is can form stacks of bolts as it goes, without any need to travel to a stacking location. By contrast, many of the prior machines can handle only a single tree at a time. Such a machine must drive to a tree, align itself beside the tree, fell and process the same, and then move to a remote stacking location to deposite the bolts. Apart from the time required for these movements of the vehicle, the need for such movements together with the need to bring the vehicle very close to the standing tree makes the machine more sensitive to ground conditions than the present machine that can choose the most favorable ground location and reach out to the trees from such location.

While machines have already been developed employing booms that extend out from the vehicle to grasp a tree, such machines have been of a type that delimbs and tops each tree as it remains standing, and then fells the tree. This type of machine is mainly a tree-length machine, that is one for producing delimbed tree lengths rather than cut bolts. In general, this type of machine tends to be a heavy machine adapted for use with larger trees and incapable of operating economically in small areas and with the smaller and medium size trees.

The present machine embodies the functional advantages of many of the prior machines, while adding the further improvement of a shorter overall time cycle resulting from overlapping of the felling and processing operations as already described.

To return to the matter of the time required for the delimbing operation touched on above, the present machine is believed to have advantages over many of the previously proposed machines in that the delimbing operation is kept separate from the advancing operation; that is the tree is stationary during delimbing and is subsequently advanced for bucking. In many prior proposals the tree is advanced through the delimbing unit. The present arrangement is preferred, because it is generally easier to cause the delimbing unit to travel rapidly in a controlled path, than to move a tree, which may be "crooked" to some extent, along an erratic path with the attendant danger of breaking or otherwise damaging the tree stem.

We claim:

1. In a timber-harvesting machine, tree-processing means comprising:

a. an elongate framework defining a first path of travel for a tree, b. tree-clamping means mounted on said framework near a first end thereof, c. tree stop means mounted at the other end of said framework, d. bucking means mounted on said framework adjacent said first end and between said two ends, e. delimbing means mounted at said first framework end on the side of said tree clamping means remote from said other end, f. and means for driving said delimbing means in reciprocable sliding movement relative to sad framework towards and away from said tree clamping means along a further path of travel forming a straight line continuation of said first path for performing a delimbing operation on an outward stroke of the delimbing means with the tree held stationary by said tree clamp means and for subsequently performing a tree propelling operation on a return stroke of the delimbing means with the tree now free to travel along said first path to said tree stop means for subsequent bucking by said bucking means, g. said driving means including pneumatic means for driving said delimbing means away from said tree clamping means and hydraulic means for driving said delimbing means toward said tree clamping means, operation of said hydraulic means serving to compress the air within said pneumatic means to store energy therein for subsequent movement of said delimbing means away from said clamping means.

2. A machine according to claim 1, including g. a self-propelled vehicle, and h. means mounting said framework on said vehicle with said first end of the framework situated at an end of said vehicle whereby said delimbing means, during an outward stroke thereof, projects beyond said vehicle end.

3. A machine according to claim 2, including
i. a boom mounted on said vehicle,
j. and means mounted on the remote end of said boom for felling a tree,
k. said boom being extensible and retractable to reach out and fell a first tree, convey such first tree to said tree processing means and subsequently return to fell a second tree while the first tree is being processed by said processing means.

4. A machine according to claim 3, including
l. tree transfer means mounted on said framework for receiving a tree from said boom,
m. and means for moving said transfer means from a substantially horizontally extending tree-receiving position to a substantially vertical tree-transferring position for introducing the end of said tree simultaneously into said tree clamp means and into said delimbing means.

5. A machine according to claim 4, including circuit means for controlling the mechanisms on said framework to carry out a processing cycle automatically upon initiation, said circuit means including
  i. means for actuating clamping tree transfer means to introduce the end of said felled tree into said clamping means and into said delimbing means,
  ii. means for closing said clamping means to clamp the tree and for closing said delimbing means to embrace the tree,
  iii. means for then driving said delimbing means along said outward stroke,
  iv. means for subsequently loosening said clamping means,
  v. means for then driving said delimbing means along said return stroke to propel the tree,
  vi. means for detecting a predetermined travel of said tree,
  vii. means actuated by said detecting means for retightening said clamping means and actuating said bucking shear means to cut a bolt from the tree,
  viii. means for causing repeated operation of said means (iii), (iv), (v), (vi) and (vii) until said clamping means detects a predetermined minimum tree diameter,
  ix. and means for finally opening said clamping means and said delimbing means to eject the remainder of the tree.

6. A machine according to claim 5, including means for detecting a second tree waiting at said tree transfer means and for, upon so detecting a second tree, reinitiating said automatic processing cycle.

7. A machine according to claim 1, in which said driving means comprises a stationary piston, a movable cylinder in surrounding relation to said piston, means defining an air chamber at one end of said cylinder between said cylinder and piston, and means defining an oil chamber at the opposite end of said cylinder between said cylinder and piston, said oil chamber being of low volume in relation to said air chamber.

UNITED STATES PATENT OFFICE
CERTIFICATE OF CORRECTION

Patent No. 3,590,760   Dated 7/6/71

Inventor(s) John H. Boyd; James K. Robinson

It is certified that error appears in the above-identified patent and that said Letters Patent are hereby corrected as shown below:

| | |
|---|---|
| Col. 8, line 49: | "round" should read ---ground---. |
| Col. 9, line 37: | "in" should read ---is---. |
| Col. 9, line 60: | "contact" should read ---contacts---. |
| Col. 12, line 16: | "it" should read ---its--- and delete "is". |
| Col. 12, line 75: | "tact" should read ---tacts---. |
| Col. 15, line 45: | Delete "in". |
| Col. 15, line 74: | "is" should read ---it---. |
| Col. 16, line 55: | "sad" should read ---said---. |

Signed and sealed this 16th day of May 1972.

(SEAL)
Attest:

EDWARD M. FLETCHER, JR.
Attesting Officer

ROBERT GOTTSCHALK
Commissioner of Patents